(12) United States Patent
Noda

(10) Patent No.: US 8,851,748 B2
(45) Date of Patent: Oct. 7, 2014

(54) THERMAL DETECTOR, THERMAL DETECTOR DEVICE, ELECTRONIC INSTRUMENT, AND METHOD OF MANUFACTURING THERMAL DETECTOR

(75) Inventor: Takafumi Noda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 428 days.

(21) Appl. No.: 13/013,040

(22) Filed: Jan. 25, 2011

(65) Prior Publication Data

US 2011/0182320 A1    Jul. 28, 2011

(30) Foreign Application Priority Data

Jan. 26, 2010    (JP) .................................. 2010-014177

(51) Int. Cl.
*G01J 5/02*    (2006.01)
*G01J 5/10*    (2006.01)
*G01J 5/34*    (2006.01)

(52) U.S. Cl.
CPC .... *G01J 5/02* (2013.01); *G01J 5/10* (2013.01); *G01J 5/34* (2013.01); *G01J 5/023* (2013.01); *G01J 5/024* (2013.01)
USPC ........... 374/121; 374/132; 250/338.4; 438/57

(58) Field of Classification Search
None
See application file for complete search history.

(56) References Cited

U.S. PATENT DOCUMENTS

| | | | |
|---|---|---|---|
| 6,495,829 B1 | 12/2002 | Oda | |
| 6,690,014 B1 * | 2/2004 | Gooch et al. | 250/338.4 |
| 7,423,270 B2 * | 9/2008 | Vilain | 250/338.1 |
| 7,718,965 B1 * | 5/2010 | Syllaios et al. | 250/338.1 |
| 7,812,385 B2 | 10/2010 | Noda | |
| 8,373,123 B2 * | 2/2013 | Ouvrier-Buffet | 250/338.1 |
| 2003/0118076 A1 * | 6/2003 | Schieferdecker et al. | 374/121 |
| 2004/0089807 A1 * | 5/2004 | Wada et al. | 250/338.1 |
| 2006/0038129 A1 * | 2/2006 | Watanabe | 250/338.1 |
| 2006/0054823 A1 * | 3/2006 | Yon et al. | 250/338.4 |
| 2006/0169902 A1 * | 8/2006 | Watanabe | 250/338.1 |
| 2007/0134817 A1 | 6/2007 | Noda | |
| 2007/0205364 A1 * | 9/2007 | Ouvrier-Buffet et al. | 250/338.1 |
| 2008/0067389 A1 * | 3/2008 | Vilain | 250/338.1 |
| 2008/0303074 A1 | 12/2008 | Noda | |
| 2009/0068763 A1 | 3/2009 | Noda | |
| 2009/0072287 A1 | 3/2009 | Noda | |
| 2009/0121136 A1 * | 5/2009 | Gruss et al. | 250/336.1 |
| 2009/0127604 A1 | 5/2009 | Noda | |
| 2009/0137065 A1 | 5/2009 | Noda et al. | |
| 2009/0140145 A1 * | 6/2009 | Ouvrier-Buffet et al. | 250/338.1 |
| 2011/0180711 A1 * | 7/2011 | Tsuchiya | 250/338.4 |

FOREIGN PATENT DOCUMENTS

| | | | |
|---|---|---|---|
| GB | 2200246 A | * | 7/1988 |
| JP | 10-019671 A | | 1/1998 |
| JP | 2000-205944 A | | 7/2000 |
| JP | 2002-214038 A | | 7/2002 |
| JP | 2003-195189 A | | 7/2003 |

(Continued)

*Primary Examiner* — Gail Verbitsky
(74) *Attorney, Agent, or Firm* — Global IP Counselors, LLP

(57) ABSTRACT

The thermal detector includes a substrate, a thermal detector element including a light absorbing film, a support member supporting the thermal detector element and supported on the substrate so that a cavity is present between the member and the substrate, and at least one auxiliary support post of convex shape protruding from either the substrate or the support member towards the other. The height of the at least one auxiliary support post is shorter than the maximum height from the substrate to the support member.

17 Claims, 10 Drawing Sheets

(56) References Cited

FOREIGN PATENT DOCUMENTS

| | | |
|---|---|---|
| JP | 2003-340795 A | 12/2003 |
| JP | 2007-150025 A | 6/2007 |
| JP | 2007-535797 A | 12/2007 |
| JP | 2008-218782 A | 9/2008 |
| JP | 2009-065089 A | 3/2009 |
| JP | 2009-071022 A | 4/2009 |
| JP | 2009-071241 A | 4/2009 |
| JP | 2009-071242 A | 4/2009 |
| JP | 2009-124017 A | 6/2009 |
| JP | 2009-129972 A | 6/2009 |
| JP | 2009-130188 A | 6/2009 |
| JP | 2009-141179 A | 6/2009 |
| WO | 2005/113421 A1 | 12/2005 |

* cited by examiner

Fig. 1C    Fig. 1D    Fig. 1E

THERMAL DETECTOR, THERMAL DETECTOR DEVICE, ELECTRONIC INSTRUMENT, AND METHOD OF MANUFACTURING THERMAL DETECTOR

CROSS-REFERENCE TO RELATED APPLICATIONS

This application claims priority to Japanese Patent Application No. 2010-014177 filed on Jan. 26, 2010. The entire disclosure of Japanese Patent Application No. 2010-014177 is hereby incorporated herein by reference.

BACKGROUND

1. Technical Field

The present invention relates to a thermal detector, to a thermal detector device, to an electronic instrument, and to a method of manufacturing a thermal detector device.

2. Related Art

In the field of thermal detectors, elements such as thermopiles, pyroelectric elements, and bolometers are known. A thermopile uses thermocouples to directly detect a rise in temperature in a light absorbing film in association with absorption of light.

A pyroelectric element utilizes the pyroelectric effect of a ferromagnetic body to detect a temperature rise in a light absorbing film in association with absorption of light. For example, ferroelectric PZT (lead zirconate titanate), lithium tantalate, and other such crystals with a high dielectric constant give rise to changes in the level of electrical polarization when heated or cooled. Specifically, spontaneous changes in the level of polarization arise when the temperature changes, producing changes in the level of surface charge; whereas in the absence of temperature change, the surface charge is neutralized. In association with changes in polarization conditions, pyroelectric current flow is produced due to changes in the amount of surface charge between electrodes connected to both ends of the ferroelectric crystal. By detecting this pyroelectric current, the quantity of irradiating light (infrared or the like) can be sensed.

A bolometer detects temperature rise associated with light absorption, in the form of changes in resistance of a thermosensitive resistance element, for example.

Typically, a thermal detector has a structure that lacks a cooling system. Consequently, it is necessary to have a structure whereby the element is housed in a hermetic package or otherwise situated in a reduced pressure environment, while providing thermal separation from the substrate and neighboring film to prevent as much as possible the diffusion of heat produced by received light (infrared or the like) to the surrounding area. One effective way to prevent dissipation of heat to the substrate and avoid diminished detection characteristics of a thermal detector is to employ a structure in which, for example, a cavity for thermal separation is provided between the substrate and the thermal detector element (see Japanese Laid-Open Patent Application 2000-205944 and Japanese Laid-Open Patent Application 2002-214038 for example). Japanese Laid-Open Patent Application 2000-205944 discloses a thermal type infrared array sensor having a cavity for thermal separation, and Japanese Laid-Open Patent Application 2002-214038 discloses a pyroelectric type infrared detector element having a cavity for thermal separation.

Additionally, infrared detector elements, which are one type of thermal detector element, are employed in the field of small scale elements as personal sensors for example, and in the field of large scale arrays as infrared camera devices for example. While initially developed as military technologies, in recent years application in consumer products is progressing, and various applications for infrared detection may be anticipated in the future.

SUMMARY

As noted, in a thermal detector element, it is important to reduce to the greatest extent possible the diffusion of heat produced by received light (including infrared) to the surrounding area. Specifically, it is preferable for the support member having the thermal detector element mounted thereon to be held suspended away from the substrate via an intervening cavity. Also, it is preferable for the member to have a low thermal capacity, in order to improve the thermal sensitivity of the detector element. It is moreover preferable for the support member itself to have at least a certain level of thermal resistance in order to inhibit heat transmission to the substrate.

For this purpose, it may be contemplated, for example, to adopt a three-dimensional structure employing a support member (e.g., a film-like member: membrane) having a mounting portion for mounting of the element, and fine arms (which also have a certain length) for supporting the mounting; and to dispose this support member held suspended away from the substrate by the aforementioned fine arms, thereby providing stable support to the support member (membrane) while inhibiting heat diffusion to the substrate.

In order to inhibit heat diffusion, it is preferable for the arms of the support member, seen in plan view, to be finely formed; but on the other hand, mechanical strength (rigidity, etc.) sufficient to stably support the element mounted on the mounting portion is also necessary. The mechanical strength of the support member affects, for example, the frequency of defects (the yield) in the process of manufacturing three-dimensional structures. For example, flexion and the like may arise in the support member due to the weight of the thermal type light absorbing element, and if the maximum distance separating the support member and the substrate is smaller than the design value, in the event that, for example, wet etching is used in order to form a cavity for thermal separation purposes, sticking (adhesion (bonding)) of the substrate and the support member is prone to occur. Sticking can be produced, for example, by surface tension of the liquid during the drying process subsequent to wet etching.

According to at least one aspect of the present invention, it is possible, for example, to concomitantly inhibit a decline of characteristics of a thermal detector element due to diffusion of heat in the element, while ensuring the mechanical strength required of the support member during manufacture.

The thermal detector according to an aspect of the present invention comprises: a substrate; a thermal detector element including a light absorbing film; a support member for supporting the thermal detector element and supported on the substrate; and at least one auxiliary support post protruding from at least one of the substrate or the support member towards the other; wherein the total projecting length of the at least one auxiliary support post is shorter than the maximum distance between the substrate and the support member.

According to this structure, utilizing the auxiliary support posts (auxiliary support portions), the support member may be stably supported during the manufacturing process. For example, a sacrificial layer composed of a sacrificial film contiguous with the auxiliary support posts (where the sacrificial layer is patterned into posts, these may be termed sacrificial support posts (or sacrificial spacers)) may be provided, and the three-dimensional structure (the three-dimensional structure including the support member and the thermal detector element formed on the support member) may be supported (upheld) by the auxiliary support posts and the sacrificial layer. By so doing, the mechanical strength of the support member during manufacture is substantially improved, and flexion towards the substrate side and the like may be inhibited. Consequently, sticking may be inhibited during the drying process in a wet etching step, for example.

On the other hand, after manufacturing steps that could pose problems have been completed, the sacrificial layer (sacrificial post), which is no longer needed, is removed, thereby forming a gap between the support member and the auxiliary support posts, which has the effect of thermally disjoining the support member and the substrate, thereby preventing heat diffusion. For example, there is formed a gap corresponding to the differential of the maximum distance between the support member and the substrate, and the total projecting length of the auxiliary support posts, whereby the support member and the auxiliary support posts are thermally separated. Therefore, once manufacture of the thermal detector element has been completed, the presence of the auxiliary support posts will not result in diffusion of heat via the auxiliary support post. Consequently, it is possible to concomitantly inhibit decline of characteristics of a thermal detector element due to diffusion of heat in the element, while ensuring the mechanical strength required of the support member during manufacture.

In the thermal detector according to another aspect of the present invention, the support member has a mounting portion for mounting the thermal detector element, and at least one arm portion linked at a first end to the mounting portion and supported at another end on the substrate; and the at least one auxiliary support post is disposed at least between the mounting portion and the substrate, or between the at least one arm portion and the substrate.

According to this aspect, the support member has a mounting portion and at least one arm for supporting the mounting portion. An auxiliary support post may be disposed between the mounting portion and the substrate (the base serving as a foundation for a sensor), and may also be disposed between the at least one arm and the substrate. Moreover, separate structures provided on the substrate (for example, various films and layers formed in layers on the substrate (such as interlayer insulating films, interlayer insulating layers, conductor films, conductor layers, and the like)) may be viewed as being part of the substrate (substrate broadly defined) (because these serve as a foundation for supporting the detector element). Specifically, auxiliary support posts may be disposed at locations having overlap (i.e., so as to have overlap) with the mounting portion, or disposed at locations having overlap (i.e., so as to have overlap) with the at least one arm, as seen in plan view.

In the thermal detector according to another aspect the present invention, one auxiliary support post is disposed at a location at the center of the support member, in plan view.

Auxiliary support posts are expected to stably support the support member and function to inhibit displacement (flexion or the like) and deformation (twisting or the like) of the support member (the mounting portion and the arms) during (at least) one period in the thermal detector manufacturing process. According to the present aspect, an auxiliary support post is disposed at a location at the center of the support member (i.e., the auxiliary support post is disposed so as to have overlap with the center of the support member), in plan view. The weight of the thermal detector element bears down directly on the mounting portion of the support member. Therefore, utilizing an auxiliary support post to support the center point of the support member is effective in terms of inhibiting flexion or the like of the support member.

Where the support member has a point-symmetric contour in relation to the center point (a contour such that the original shape is retraced after rotation by 180°) (however, no limitation thereto is intended), the center point thereof will coincide with the gravity center of the contour (i.e., the support member). Therefore, utilizing an auxiliary support post to support the center point is effective in terms of inhibiting flexion or the like of the support member.

In the thermal detector according to another aspect of the present invention, pairs of auxiliary support posts are respectively disposed at locations that are mutually point-symmetric with respect to the center of the support member in plan view.

According to this aspect, a pair of auxiliary support posts is respectively disposed at mutually point-symmetric locations (i.e., locations of mutual overlap with 180° rotation) with respect to the center of the support member in plan view. By so doing, the support member may be supported in well balanced fashion by the auxiliary support posts, and displacement and deformation may be effectively inhibited.

According to another aspect of the thermal detector of the present invention, the thermal detector element is an infrared detector element.

According to this aspect, it is possible to realize an infrared detector that is compact, has low thermal capacity, and is moreover obtained with good yield (i.e., with a minimum of defects due to sticking or the like in the manufacturing process).

In the thermal detector device according to another aspect of the present invention, a plurality of any of the thermal detectors described above are disposed in a two-dimensional arrangement.

By so doing, there may be realized a thermal detector device (thermal type photo array sensor) furnished with a plurality of thermal detectors (thermal detector elements) in a two-dimensional arrangement (for example, arranged in an array along each of two orthogonal axes).

The electronic instrument according to another aspect of the present invention comprises any of the aforementioned thermal detectors.

Each of the thermal detectors described above has high sensitivity to heat owing to its small thermal capacity, and moreover may be manufactured at high yield, making it possible to reduce manufacturing costs. An electronic instrument furnished with such a thermal detector affords comparable advantages. For example, employing these thermal detectors as sensors equivalent to one cell or to several cells, it is possible to build electronic instruments of various kinds, such as analytical systems (measurement systems) for analyzing (measuring) physical information of objects, security systems for detecting fire or heat, FA (factory automation) systems for factories, and the like.

The electronic instrument according to another aspect of the present invention comprises the thermal detector device.

The thermal detector device described above has high sensitivity to heat owing to its small thermal capacity, and moreover may be manufactured at high yields, making it possible to reduce manufacturing costs. An electronic instrument furnished with this thermal detector device affords comparable advantages. Appropriate examples of electronic instruments include for example thermography systems for outputting images of light (temperature) distribution, or vehicle-mounted night vision or monitoring cameras.

The method for manufacturing a thermal detector according to another aspect of the present invention is a method for manufacturing a thermal detector having a substrate, a thermal detector element, a support member for supporting the thermal detector element, the support member supported on the substrate, and at least one auxiliary support post protruding from at least one of the substrate and the support member towards the other, the total projecting length of the at least one auxiliary support post being shorter than the maximum distance between the substrate and the support member, wherein the method comprises: a step for forming on the substrate a first sacrificial layer made of a material different from that of the auxiliary support post layer so as to fill a space to serve as a cavity between the substrate and the support member; a step for forming an auxiliary support post layer as a first auxiliary support post in a case where the at least one auxiliary support post includes the first auxiliary support post; a step for forming a second sacrificial layer, which is conjoined with the first auxiliary support post layer, is made of a material different from that of the respective materials constituting the auxiliary support post layer and the first sacrificial layer, and has a prescribed thickness set so that a sum total projection length equal to the sum of the projection length of the first auxiliary support post layer and a projection length corresponding to the thickness of the first sacrificial layer becomes the maximum distance between the substrate and the support member; a step for forming the support member on a layered structure made of the first auxiliary support post layer and the second sacrificial layer conjoined with the first auxiliary support post layer; a step for forming the thermal detector element on the support member; a step for removing the first sacrificial layer; and a step for removing the second sacrificial layer.

According to the present aspect, a first sacrificial layer is utilized to form a cavity between the substrate and the support member, and a second sacrificial layer utilized to form a gap between the auxiliary support post and the support member. For example, prior to formation of the support member, the first sacrificial layer is formed so as to fill (in other words, pack into) a space that is to define a cavity.

Also, a second sacrificial layer (where the second sacrificial layer is patterned into posts, these may be termed sacrificial support posts) is formed contiguous with the auxiliary support posts. Where a material layer for forming the support member is formed over the second sacrificial layer, the support member may be supported by the auxiliary support posts and the sacrificial layer (sacrificial support posts), thereby substantially improving the mechanical strength of the support member.

After the support member has been formed (e.g., after at least a portion of the thermal detector element has been formed), the first sacrificial layer is selectively removed, thereby forming a cavity. At this time, because the support member is supported on the substrate by the auxiliary support posts and the sacrificial layer (the sacrificial support posts), displacement and deformation are minimized, and even when the first sacrificial layer is removed by wet etching, the occurrence of sticking (the phenomenon of bonding of the substrate and part of the support member due to surface tension of the liquid) is minimized.

During removal by etching of the first sacrificial layer, because the constituent materials of the auxiliary support posts and the second sacrificial layer differ therefrom, these are left without being removed. With regard to the substrate and the support member, where a film functioning as a etching stopper with respect to the etchant used for the aforementioned first sacrificial layer is formed on the surfaces thereof, for example, these portions will be unaffected by etching of the first sacrificial layer.

After the cavity is formed, the second sacrificial layer (sacrificial support posts), which is no longer needed, is removed by etching, for example, thereby forming a gap between the support member and the auxiliary support posts. For example, there is formed a gap corresponding to the differential of the maximum distance between the support member and the substrate, and the total projection length of the auxiliary support posts. This gap serves as a thermal separation gap providing thermal separation of the auxiliary support posts and the support member. Where the thermal detector element is placed in a hermetically sealed, reduced pressure package, for example, the heat separation function by the gap is enhanced. Because the support member and the auxiliary support posts are thermally separated, once manufacture of the thermal detector element is completed, the thermal capacity of the support member is unaffected by the presence of the auxiliary support posts.

In the method for manufacturing a thermal detector according to another aspect of the present invention, the step for forming the auxiliary support post layer includes a step for patterning the first sacrificial layer and forming a first opening for forming the first auxiliary support post layer, and a step for filling the first opening with a material constituting the first auxiliary support post layer; and the step for forming the second sacrificial layer includes a step for forming a second sacrificial layer set to the prescribed thickness, and subsequently patterning the second sacrificial layer.

According to the present aspect, auxiliary support posts are formed by filling openings selectively provided in the first sacrificial layer with an auxiliary support post layer (i.e., once the first sacrificial layer has been removed, the filled auxiliary support post layer provides the auxiliary support posts). Further, a second sacrificial layer is formed over the auxiliary support post layer, and the second sacrificial layer is patterned to form a second sacrificial layer (specifically, sacrificial support posts composed of the material of the second sacrificial layer) contiguous with the auxiliary support posts.

According to this manufacturing method, auxiliary support posts and a second sacrificial layer (sacrificial support posts) composed of different materials may be formed in a reasonable manner utilizing a semiconductor manufacturing method (photolithography).

According to at least one aspect of the present invention as set forth above, it is possible to concomitantly reduce the thermal capacity of a support member for supporting a thermal detector element, while ensuring the mechanical strength needed in the manufacturing process, for example.

BRIEF DESCRIPTION OF THE DRAWINGS

Referring now to the attached drawings which form a part of this original disclosure:

FIG. 1A to FIG. 1E are drawings illustrating a configuration of an example of a thermal detector (here, a pyroelectric type infrared detector) having auxiliary support posts;

DETAILED DESCRIPTION OF EXEMPLARY EMBODIMENTS

The preferred embodiments of the present invention are described in detail below. The embodiments described hereinbelow should not be understood as unduly limiting the scope of the invention disclosed in the appended claims, and it will be appreciated that not all elements of the configurations described in the embodiments are essential as means for solving the problems according to the present invention.

First Embodiment

Figure 1A:
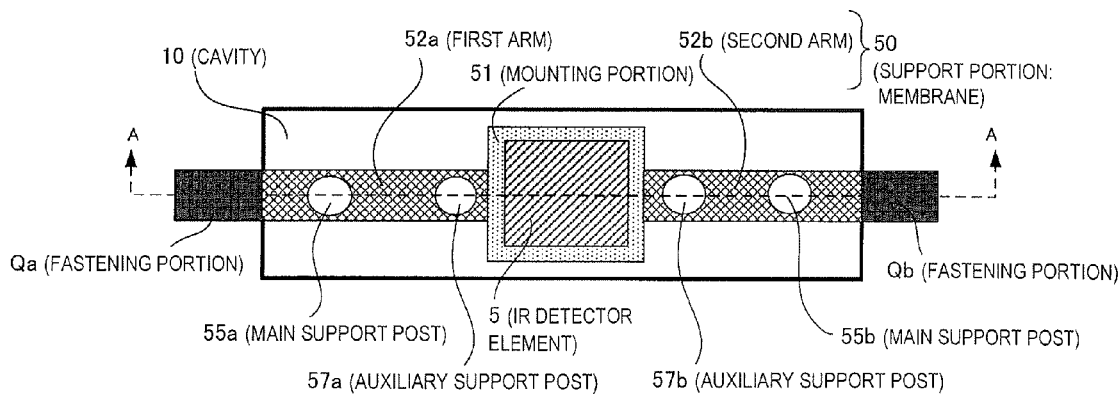
Figure 1B:
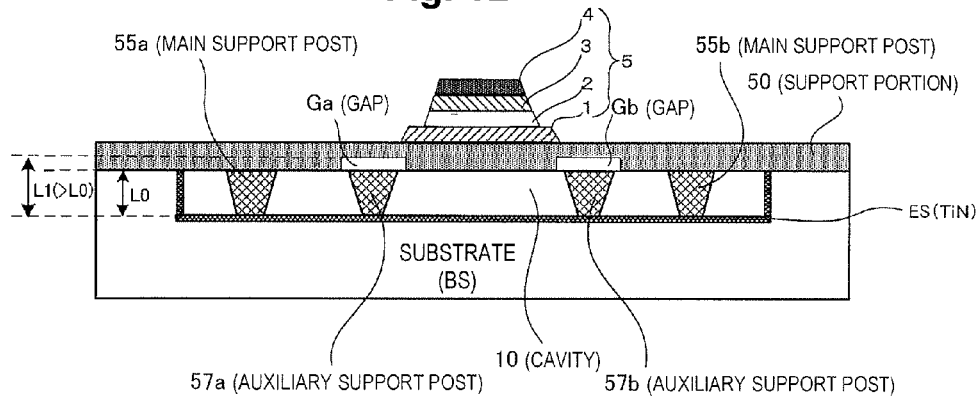
Figure 1B:
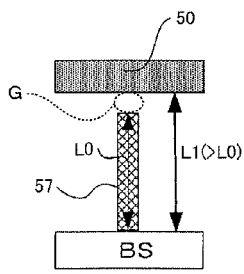
Figure 1B:
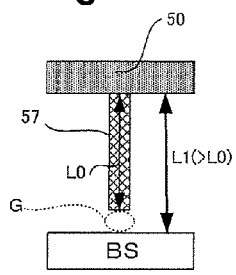
Figure 1B:
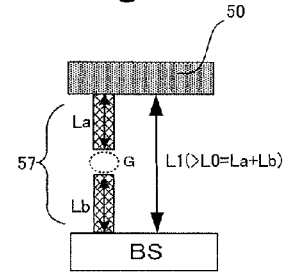

FIG. 1A to FIG. 1E are drawings illustrating a configuration of an example of a thermal detector (here, a pyroelectric type infrared detector) having auxiliary support posts. FIG. 1A is a plan view of principal portions of the thermal detector; FIG. 1B is a cross-sectional view taken along line A-A in FIG. 1A; and FIG. 1C to FIG. 1E are respectively drawings showing configuration examples of auxiliary support posts.

The thermal detector shown in FIG. 1A and FIG. 1B is a pyroelectric type infrared detector (pyroelectric type infrared sensor) having a three-dimensional structure formed on a substrate using MEMS (Micro-Electrical-Mechanical Systems) technology (a semiconductor manufacturing technology).

Pyroelectric Type Photodetector Configuration Example

As shown in FIG. 1A and FIG. 1B, a cavity 10 is provided between the substrate BS and the support member 50. The cavity 10 has a function, for example, of thermally separating the substrate BS from portions of the support member 50 other than the supported portions. An etching stopper film ES (e.g., a titanium nitride film: TiN) that serves as an etching stopper during formation of the cavity 10 is formed on the surface of the substrate BS (the surface of the recessed portion).

Figure 7:
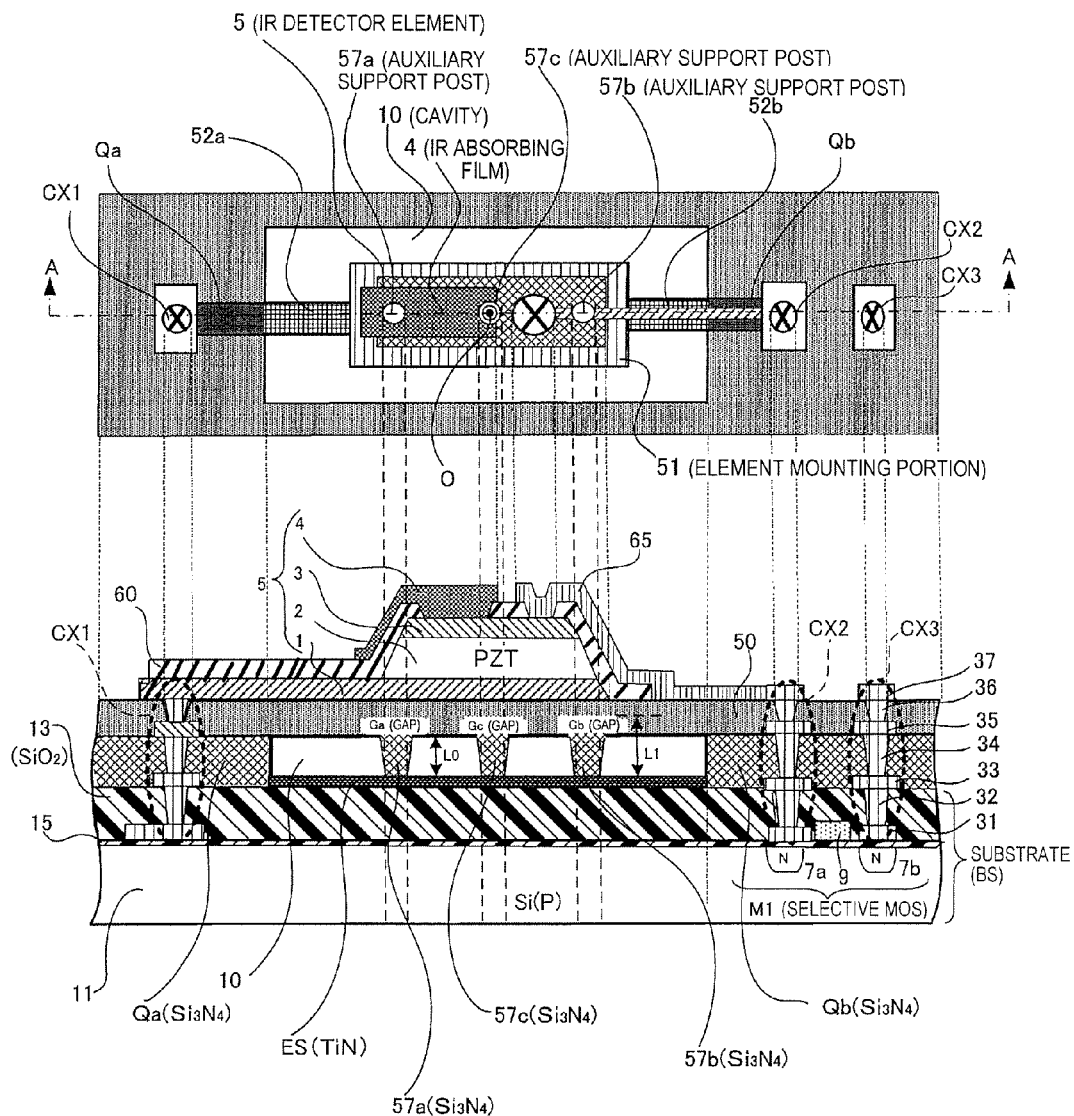
FIG. 7 is a drawing showing another example of a thermal detector device (an example of a circuit element such as a transistor formed on a substrate)

The support member 50 is disposed above the cavity 10. The substrate BS, narrowly defined, is a silicon substrate, for example, but may also be broadly defined as a base serving as a foundation for a sensor (sensor base). The substrate (base) broadly defined includes an insulating layer (interlayer insulating film) formed on the surface of the silicon substrate, and so on. Specifically, separate structures provided on the substrate (for example, various films and layer formed in layers on the substrate (for example, interlayer insulating films, interlayer insulating layers, conductor films, conductor layers, and the like)) may be viewed as being part of the substrate, as these serve as a foundation for supporting the detector element. A specific example of a substrate BS broadly defined in this way is depicted in FIG. 7.

The support member 50 is a member of film form (membrane) formed from a silicon nitride film ($Si_3N_4$ film)/silicon oxide film ($SiO_2$ film)/silicon nitride film ($Si_3N_4$ film) layered film (polycide), for example. The support member (membrane) 50 preferably has a low thermal capacity in order to inhibit dissipation of heat from the infrared absorbing film 4.

The support member (membrane) 50 has a mounting portion 51 for mounting the infrared detector element 5; a first arm (first arm portion) 52a linked at one end thereof to one end of the mounting portion 51 and supported at the other end thereof on the substrate BS (here, a fastening portion Qa of the substrate BS); and a second arm (first arm portion) 52b linked at one end thereof to the other end of the mounting portion 51, and supported at the other end thereof on the substrate BS side (here, a fastening portion Qb of the substrate BS).

The pyroelectric type infrared detector (pyroelectric type photodetector element) 5 provided as the thermal detector element has a lower electrode 1, a pyroelectric film (ferroelectric film) 2, an upper electrode 3, and an infrared absorbing film 4 provided as the light absorbing film. The lower electrode (first electrode) 1 and the upper electrode (second electrode) 3 are formed through successive deposition of three layers of metal film, for example. These may have a three layer structure composed, in order from the location furthest away from the pyroelectric film (ferroelectric film) 2, of an iridium (Ir) layer formed by sputtering, for example; an iridium oxide (IrOx) layer; and a platina (Pt) layer, for example. PZT (Pb(Zi, Ti)$O_3$: lead zirconate titanate) may be used for the pyroelectric film (ferroelectric film) 2, for example. The pyroelectric film (ferroelectric film) 2 may be grown by a sputtering process or MOCVD process, for example. The lower electrode (first electrode) 1 and the upper electrode (second electrode) 3 have a film thickness of about 0.4 μm, for example, while the pyroelectric film (ferroelectric film) 2 has a film thickness of about 0.1 μm, for example.

Example of Forming Auxiliary Support Posts

As shown in FIG. 1A and FIG. 1B, in the present embodiment, in addition to main support posts (principal support posts, principal posts, or principal supporting portions) 55a, 55b, there are provided auxiliary support posts (auxiliary posts or auxiliary supporting portions) 57a, 57b for the purpose of inhibiting displacement and deformation of the support member 50 during manufacture (for the purpose of enhancing mechanical strength during manufacture).

As shown in FIG. 1A, the main support post 55a and the auxiliary support post 57a are disposed at locations overlapping the first arm 52a in plan view in the support member 50, and likewise, the main support post 55b and the auxiliary support post 57b are disposed at locations overlapping the second arm 52b in plan view. A total of four support posts (posts) are provided, with the two support posts 55a, 55b at locations further away from the infrared detector element being called main support posts, and the two support posts 57a, 57b at locations closer to the infrared detector element being called auxiliary support posts.

As shown in FIG. 1B, the main support posts 55a, 55b are disposed between the substrate BS, and the first arm 52a or the second arm 52b of the support member 50. At their upper faces, the main support posts 55a, 55b respectively contact the bottom faces of the first arm 52a and the second arm 52 to support the support member 50 (i.e., the first arm 52a and the second arm 52) as well as inhibiting flexion of the support member 50 (and particularly of the mounting portion 51) towards the substrate direction.

Meanwhile, the auxiliary support posts 57a, 57b are used to support the support member 50 and inhibit the occurrence of flexion and the like during (a period of) the manufacturing process. Then, once manufacturing steps that can pose problems (such as the wet etching step to form the cavity 10, in which sticking is prone to occur) have been completed, the posts are separated (disjoined) from the support member 50 by gaps Ga, Gb. Specifically, the auxiliary support posts 57a, 57b are thermally separated from the support member 50.

For example, by forming a sacrificial layer composed of a sacrificial film (where the sacrificial layer is patterned into posts, these can be called sacrificial support posts (sacrificial spacers)) conjoined with the auxiliary support posts 57a, 57b, the support member 50 can be supported by the auxiliary support posts (57a, 57b) and the sacrificial layer (sacrificial support posts). By so doing, the mechanical strength of the support member 50 may be substantially improved. Consequently, sticking may be inhibited during the drying process subsequent to the wet etching step or the like.

The gaps Ga, Gb are formed between the support member and the auxiliary support posts through removal of the sacrificial layer (sacrificial support posts), which is no longer needed once manufacturing steps that can pose problems have been completed. Specifically, with the thermal detector in the completed state, where the maximum distance between the support member 50 and the substrate BS is designated as L1 and the total projecting length of the auxiliary support posts 57a, 57b is designated as L0, there exists the relationship: L1>L0. The gaps Ga, Gb having clearance corresponding to the differential of L1 and L0 are then formed, thereby thermally separating the support member 50 and the auxiliary support posts 57a, 57b. Therefore, after manufacture of the thermal detector element has been completed, the presence of the auxiliary support posts has no effect on diffusion of heat via the support member 50. Consequently, it is possible to both reduce the thermal capacity of the support member which supports the thermal detector element, and to ensure the necessary mechanical strength during the manufacturing steps.

It is not always necessary to provide the main support posts 55a, 55b. For example, if the distances of the first arm 52a and the second arm 52b are short, in some instances the first arm 52a and the second arm 52b may be supported simply by fastening portions Qa, Qb situated on the substrate BS side.

However, from the standpoint of minimizing as much as possible the escape of heat to the substrate BS side, it is preferable for the arm portions 52 (the first arm portion 52a, the second arm portion 52b) to have high heat thermal resistance, and in this regard it is preferable for the arm portions 52 (the first arm portion 52a, the second arm portion 52b) to have somewhat extended total length (because the heat thermal resistance of the arm portions 52 increases in proportion to total length of the arm portions 52). On the other hand, from the standpoint of inhibiting as much as possible buildup of heat in support member 50 itself, it is preferable for the thermal capacity to be low, and for the support member of film form (membrane) 50 to be fairly thin in order to reduce its cross-sectional area; however, the rigidity of the support member (membrane) is lower in association with the reduced thickness of the support member (membrane) 50, making the member more susceptible to displacement such as flexion, deformation such as twisting, and the like.

Consequently, where the arm portions 52 (the first arm portion 52a, the second arm portion 52b) have total length that is extended, the particular problem of insufficient rigidity of the support member (membrane) 50 tends to arise during the manufacturing process in particular, and as noted previously this increases the likelihood that sticking will occur during wet etching, for example. In this case, it is preferable to adopt a structure like that shown in FIG. 1A and FIG. 1B, i.e., first providing main support posts 55a, 55b at locations further away from the infrared detector element 5 in plan view, then providing auxiliary support posts 57a, 57b at locations closer to the infrared detector element 5. Through concomitant use of main support posts and auxiliary support posts, displacement and deformation of the support member 50 may be effectively inhibited.

Possible modes of forming the auxiliary support posts include those depicted in FIG. 1C to FIG. 1E. In the example of FIG. 1C, the auxiliary support post 57 projects towards the support member 50 from the substrate BS, with a gap (air gap) G disposed on the support member 50 side. In the structure depicted in FIGS. 1A and 1B, auxiliary support posts of the mode of FIG. 1C are used.

In the example of FIG. 1D, the auxiliary support post 57 projects towards the substrate BS from the support member 50, with a gap G disposed on the substrate BS side. In the example of FIG. 1E, a pair of auxiliary support posts 57 is provided. One of the pair of auxiliary support posts 57 projects towards the support member 50 from the substrate BS, the projection length thereof being denoted as La; while the other projects towards the substrate BS from the support member 50, the projection length thereof being denoted as Lb. A gap G is formed at a location between the pair of auxiliary support posts 57. Where the total projecting length of the auxiliary support posts 57 is designated as L0(=La+Lb) and the maximum distance between the support member 50 and the substrate BS is designated as L1, there exists the relationship: L1>L0.

The one or more auxiliary support posts (57a, 57b, etc.) may be disposed between the substrate BS and the mounting portions 51 which is a constituent element of the support member 50 and/or between the one or more arm portions (52a, 52b) and the substrate BS, as seen in cross section. Specifically, the auxiliary support posts (57a, 57b, etc.) may be disposed at locations having overlap (i.e., so as to have overlap) with the mounting portion 51, or disposed at locations having overlap (i.e., so as to have overlap) with the one or more arm portions (52a, 52b), as seen in plan view.

Method of Manufacturing Three-Dimensional Structure

Figure 2A:
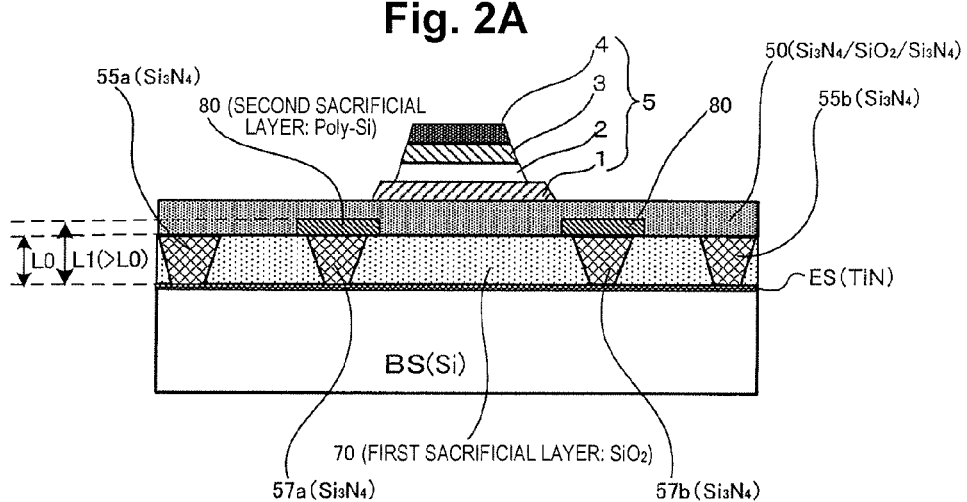
FIG. 2A to FIG. 2C are drawings showing an overview of a method of manufacturing a three dimensional structure of a thermal detector.
Figure 2B:
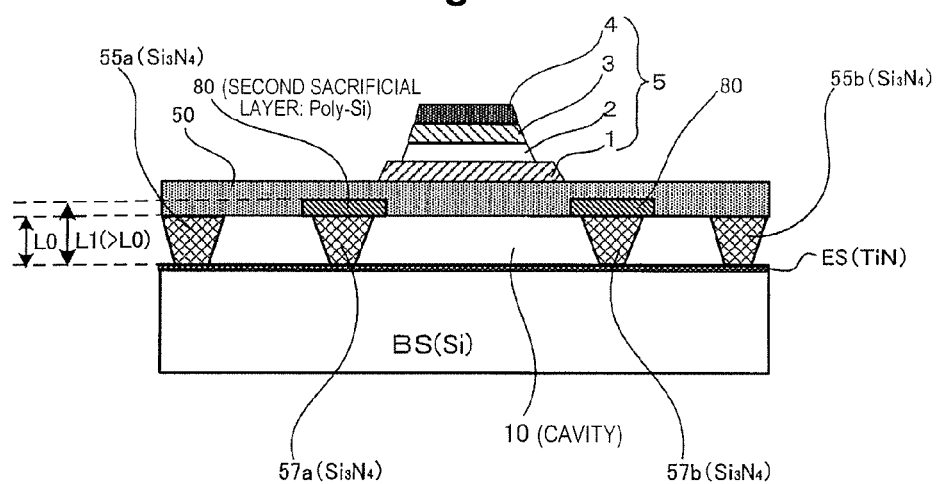
Figure 2C:
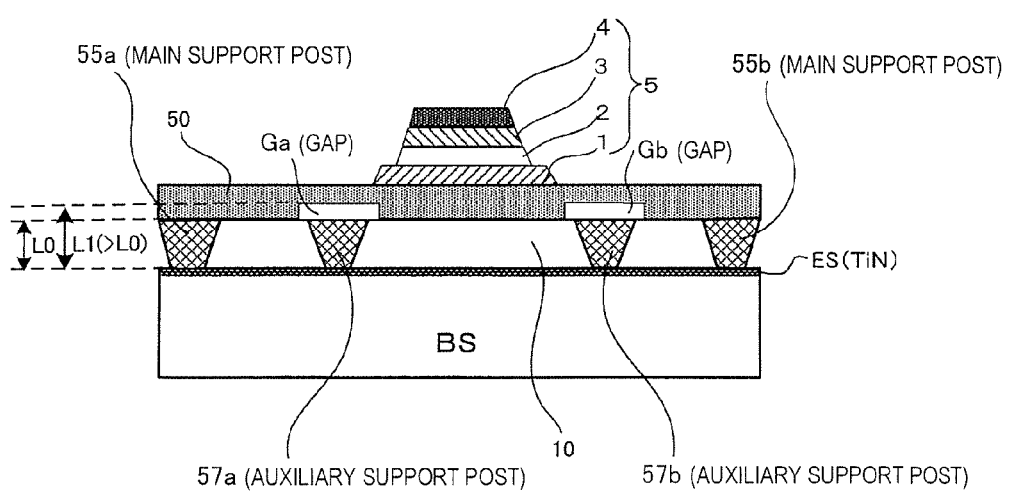

FIG. 2A to FIG. 2C are drawings showing an overview of a method of manufacturing a three dimensional structure of a thermal detector. In FIG. 2A to FIG. 2C, sections comparable to those in FIG. 1 are assigned like reference symbols.

In the case of producing a thermal detector having the cross-sectional structure depicted in FIG. 1B, first, a silicon substrate BS is subjected to etching to form a recessed portion, and the recessed portion surface is covered with an etching stopper film ES (TiN). Then, using MEMS technology or semiconductor manufacturing technology, a three-dimensional structure like that shown in FIG. 2A is produced by photolithography. The specific manufacturing process for this three-dimensional structure is discussed later.

In FIG. 2A, the substrate BS is composed of silicon, the main support posts 55a, 55b and the auxiliary support posts 57a, 57b are composed of silicon nitride ($Si_3N_4$), the first sacrificial layer 70 is composed of a silicon oxide film ($SiO_2$ film), and the second sacrificial layer 80 is composed of polysilicon (Poly-Si). The support member 50 is a member of film form (membrane) formed from a silicon nitride film ($Si_3N_4$ film)/silicon oxide film ($SiO_2$ film)/silicon nitride film ($Si_3N_4$ film) layered film (polycide).

Next, as shown in FIG. 2B, a cavity 10 is formed by removal of the first sacrificial layer 70 through etching. Next, as shown in FIG. 2B, gaps Ga, Gb are formed by removal of the second sacrificial layer (sacrificial support posts or sacrificial spacers) 80 through etching. During etching of the second sacrificial layer (sacrificial support posts or sacrificial spacers) 80, it is preferable to employ dry etching in order to prevent sticking (while concomitant use of wet etching and dry etching is possible, the use of dry etching for final etching is preferred).

Specific Example of Method of Manufacture

The following description of a specific example of a method of manufacturing a three-dimensional structure of a thermal detector makes reference to FIGS. 3A to 3E, FIGS. 4A to 4D, and FIGS. 5A and 5B. FIGS. 3A to 3E, FIGS. 4A to 4D, and FIGS. 5A and 5B are respectively drawings illustrating a specific example of a method of manufacturing a three dimensional structure of a thermal detector. In the drawings, sections common to previous drawings are assigned like reference symbols.

Figure 3A:
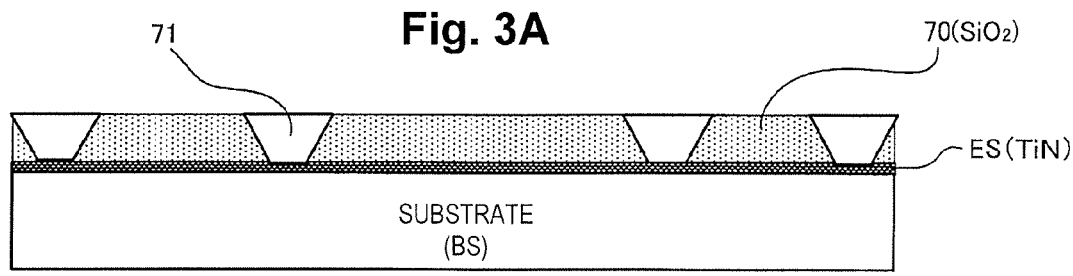
FIG. 3A to FIG. 3E are drawings illustrating a specific example of a method of manufacturing a three dimensional structure of a thermal detector.

In the case of producing a thermal detector having the cross-sectional structure depicted in FIG. 1B, first, a silicon substrate BS is subjected to etching to form a recessed portion, and the recessed portion surface is covered with an etching stopper film ES (TiN). Next, as shown in FIG. 3A, a first sacrificial layer ($SiO_2$ layer) 70 is formed over the substrate BS so as to fill (pack) a space that is to define the cavity 10. Next, the first sacrificial layer ($SiO_2$ layer) 70 is patterned to produce openings 71 at locations where the main support posts and auxiliary support posts are to be formed.

Figure 3B:
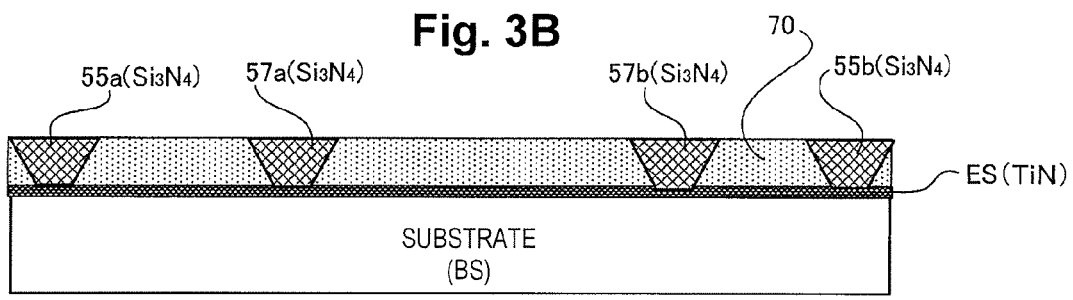

Next, as shown in FIG. 3B, the openings 71 are filled with a silicon nitride layer ($Si_3N_4$ layer) providing the main support post layers 55a, 55b and the auxiliary support post layers 57a, 57b. Specifically, for example, after forming a silicon nitride layer ($Si_3N_4$ layer) over the entire face, the silicon nitride layer ($Si_3N_4$ layer) overlying the first sacrificial layer 70 is removed by an etch-back process, whereby the openings 71 are filled with a silicon nitride layer ($Si_3N_4$ layer) serving as the main support post layers and the auxiliary support post layers. That is, the auxiliary support posts 57a, 57b may be formed through infill of auxiliary support post layers into the openings 71 which are selectively provided in the first sacrificial layer 70. According to this method, the auxiliary support posts 57a, 57b may be formed in a reasonable manner utilizing a semiconductor manufacturing method (photolithography).

Figure 3C:
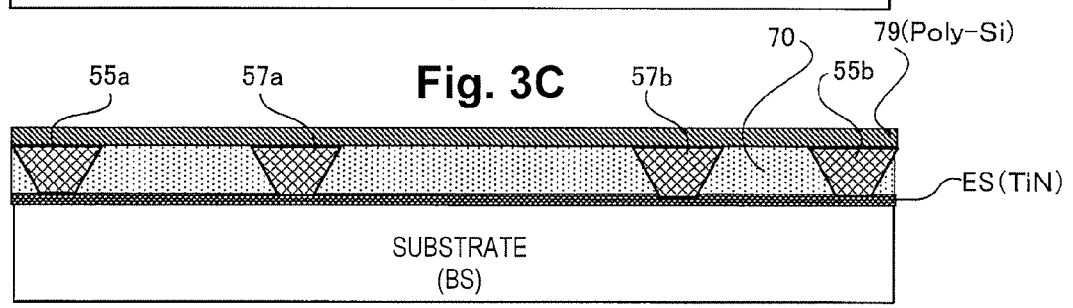
Figure 3D:
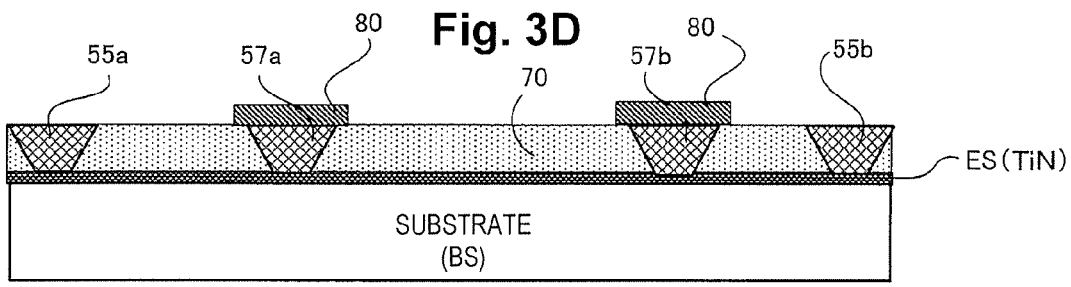
Figure 3E:
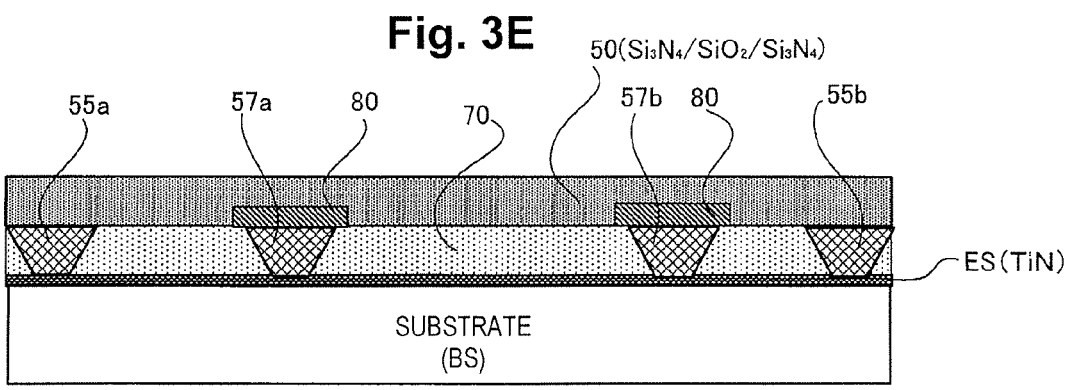

Next, as shown in FIG. 3C, a second sacrificial layer (Poly-Si layer) 79 is formed. Next, as shown in FIG. 3D, the second sacrificial layer (Poly-Si layer) 79 is patterned to form a second sacrificial layer (Poly-Si layer) 80 provided as sacrificial support posts (sacrificial spacers). Next, as shown in FIG. 3E, a support member (membrane) 50 composed of a silicon nitride film ($Si_3N_4$ film)/silicon oxide film ($SiO_2$ film)/silicon nitride film ($Si_3N_4$ film) layered film (polycide) is formed.

Figure 4A:
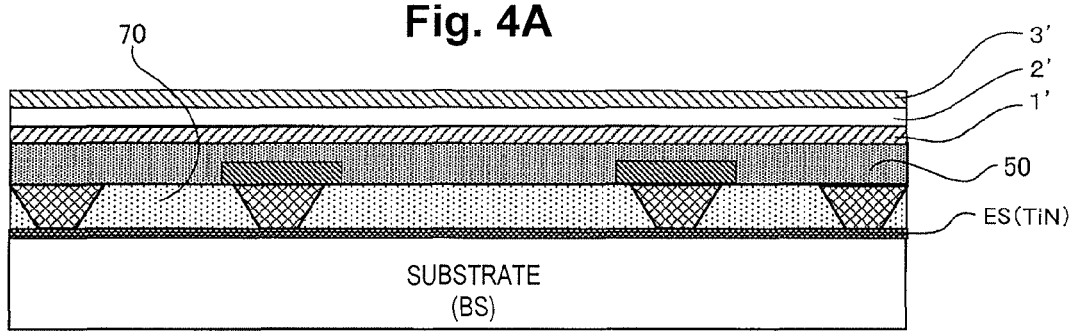
FIG. 4A to FIG. 4D are drawings illustrating a specific example of a method of manufacturing a three dimensional structure of a thermal detector.

Reference is now made to FIG. 4A to FIG. 4D. As shown in FIG. 4A, first, a lower electrode constituent material layer 1', a ferroelectric layer (PZT layer) 2', and an upper electrode constituent material layer 3' are sequentially layered. The lower electrode constituent material layer 1' and the upper electrode constituent material layer 3' may each have a three layer structure composed, in order from the location furthest away from the ferroelectric layer 2', of iridium (Ir), iridium oxide (IrOx), and platina (Pt), for example. PZT (Pb(Zi, Ti)$O_3$: lead zirconate titanate) may be used for the ferroelectric layer 2'. PZT (Pb(Zi, Ti)$O_3$: lead zirconate titanate) may be used for the ferroelectric layer 2'. These films may be grown by a sputtering process or MOCVD process, for example. The lower electrode constituent material layer 1' and the upper electrode constituent material layer 3' have film thickness of about 0.4 μm, for example, while the ferroelectric layer 2' has film thickness of about 0.1 μm, for example.

Figure 4B:
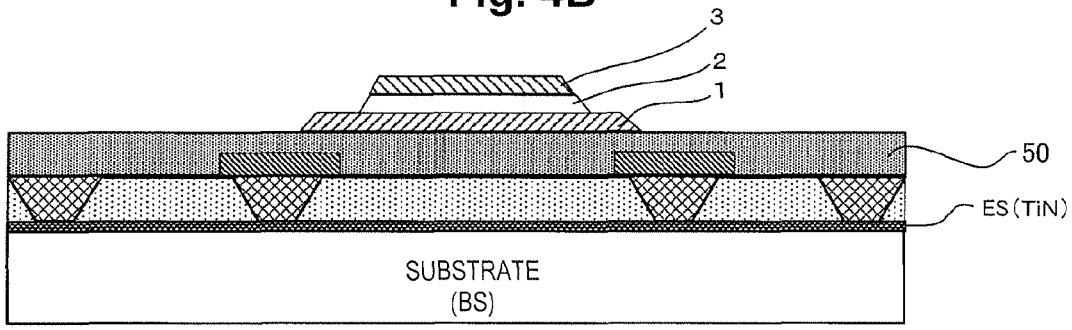
Figure 4C:
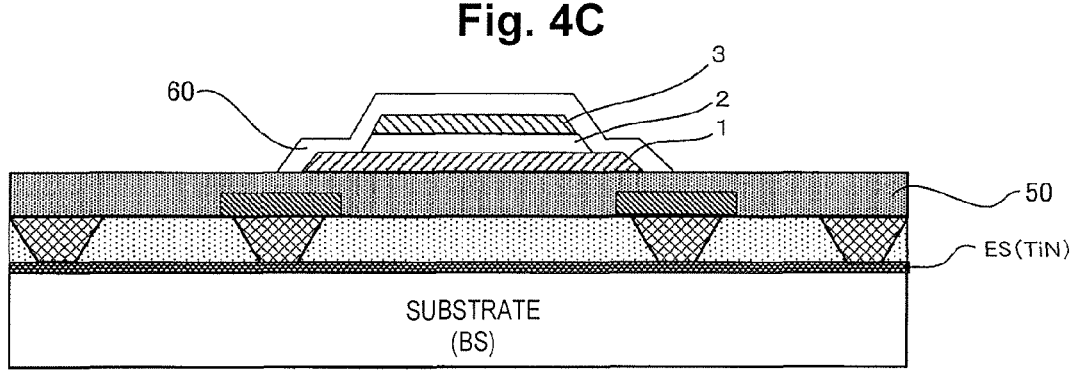
Figure 4D:
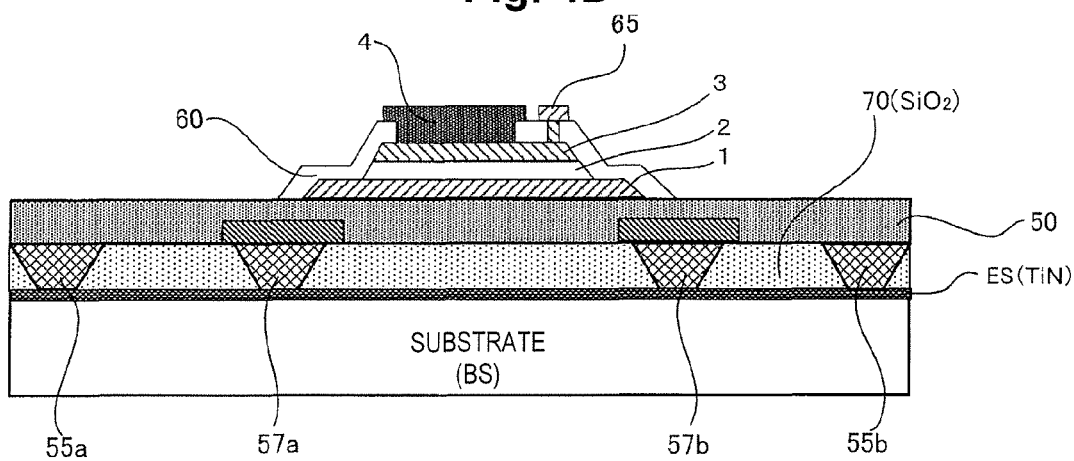

Next, as shown in FIG. 4B, the lower electrode constituent material layer 1', the ferroelectric layer (PZT layer) 2', and the upper electrode constituent material layer 3' are respectively patterned to produce an upper electrode 1, a ferroelectric film (PZT film) 2, and a lower electrode 3 (thereby forming a layered capacitor). Next, the top of the layered capacitor is covered by an electrically insulating film 60, as shown in FIG. 4C. Next, as shown in FIG. 4D, a light absorbing film (infrared absorbing film) 4 and an extraction electrode layer 65 are formed. The light absorbing film (infrared absorbing film) 4 may be an $SiO_2$ film for example.

Figure 5A:
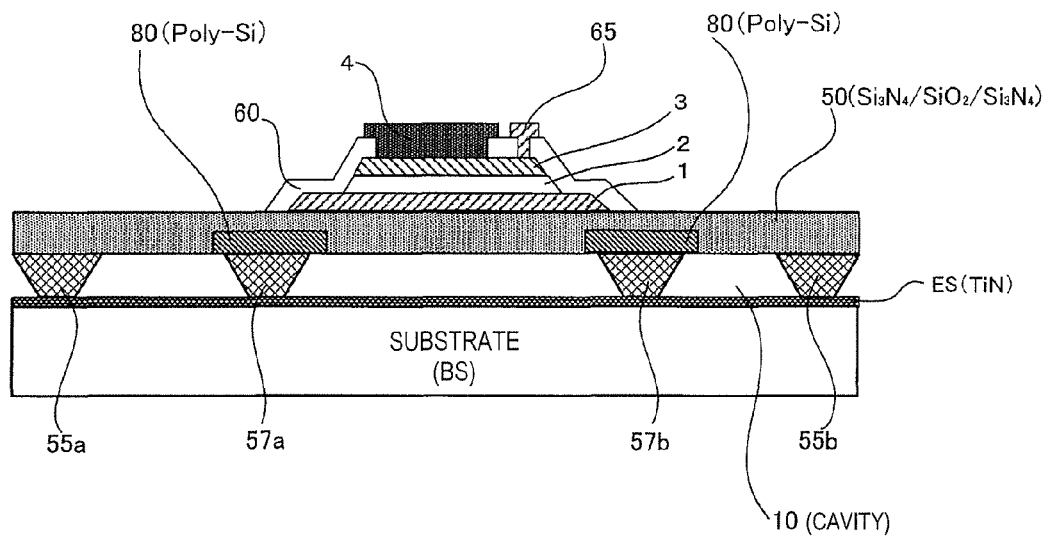
FIG. 5A and FIG. 5B are drawings illustrating a specific example of a method of manufacturing a three dimensional structure of a thermal detector.
Figure 5B:
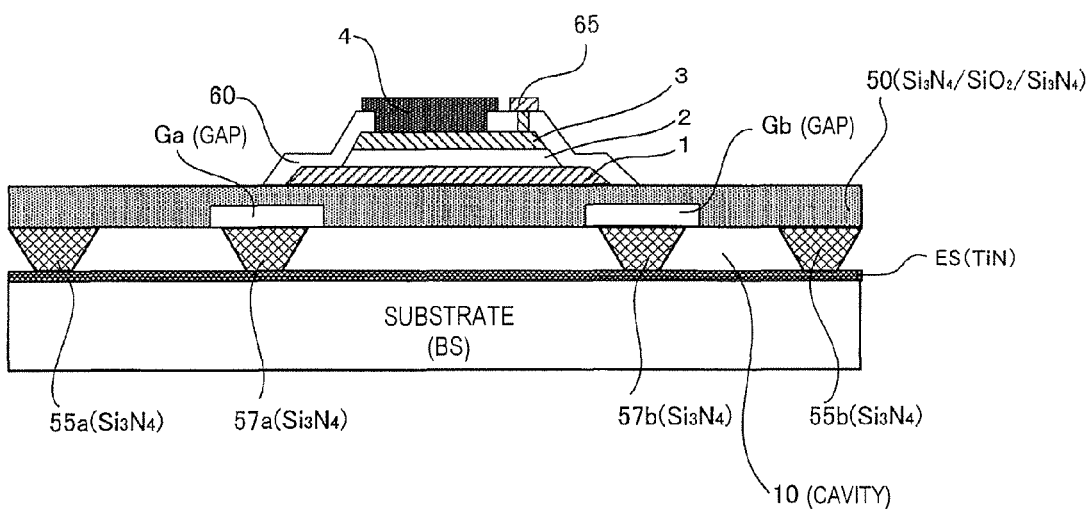

Reference is now made to FIG. 5A and FIG. 5B. As shown in FIG. 5A, the first sacrificial layer ($SiO_2$ layer) 70 is removed using a hydrofluoric acid based etchant, for example. A cavity 10 for thermal separation purposes is formed thereby. During this time, the support member 50 is provided with stable support by the main support posts 55a, 55b and the auxiliary support posts 57a, 57b, thereby inhibiting displacement and deformation, and making sticking unlikely to occur.

During removal of the first sacrificial layer ($SiO_2$ layer) 70 by etching, because the constituent materials of the main support posts 55a, 55b, the auxiliary support posts 57a, 57b, and the second sacrificial layer 80 differ therefrom, these remain without being removed. Moreover, because the etching stopper film ES (TiN film) has been formed on the surface of the substrate BS, and the front and back faces of the support member (membrane) 50 are $Si_3N_4$ films, these remain without being removed as well.

Next, as shown in FIG. 5B, the second sacrificial layer (Poly-Si sacrificial support posts (sacrificial spacers)) is removed through etching. Gaps Ga, Gb are formed thereby. In order to prevent sticking, this etching is carried out by dry etching (e.g., plasma dry etching using an $XeF_2$ based etching gas). While concomitant use of wet etching and dry etching is possible as well, in this case, it is preferable to use dry etching for the final etching. According to this method, the gaps Ga, Gb for thermal separation purposes may be formed in a reasonable manner utilizing a semiconductor manufacturing method (photolithography).

After the cavity 10 is formed, the second sacrificial layer (sacrificial support posts, sacrificial spacers), which is no longer needed, is removed, thereby forming gaps between the support member 50 and the auxiliary support posts 57a, 57b, and disjoining the two. For example, gaps Ga, Gb having clearance corresponding to the differential of the maximum distance L1 between the support member 50 and the substrate BS and the total projecting length L0 of the auxiliary support posts 57a, 57b are formed. These gaps Ga, Gb serve as thermal separation gaps for thermally separating the auxiliary support posts 57a, 57b and the support member 50. Where the thermal detector is placed inside a hermetically sealed, reduced pressure package, for example, the insulating effect of the gaps Ga, Gb is enhanced. Because the support member 50 and the auxiliary support posts 57a, 57b are thermally separated, once manufacture of the thermal detector is finished, the presence of the auxiliary support posts 57a, 57b has no effect on the thermal capacity, and no paths for heat dissipation via the auxiliary support posts 57a, 57b are formed.

A thermal detector (an infrared detector or the like) is formed in this manner. Because this thermal detector (infrared detector or the like) is manufactured using semiconductor manufacturing technology, miniaturization (scale reduction) is possible; and because the auxiliary support posts (auxiliary posts) are thermally separated from the support member by gaps, there is no decline in the element characteristics; and problems such as sticking are unlikely to occur during the manufacturing process, thereby affording manufacture with good yield.

Second Embodiment

Figure 6A:
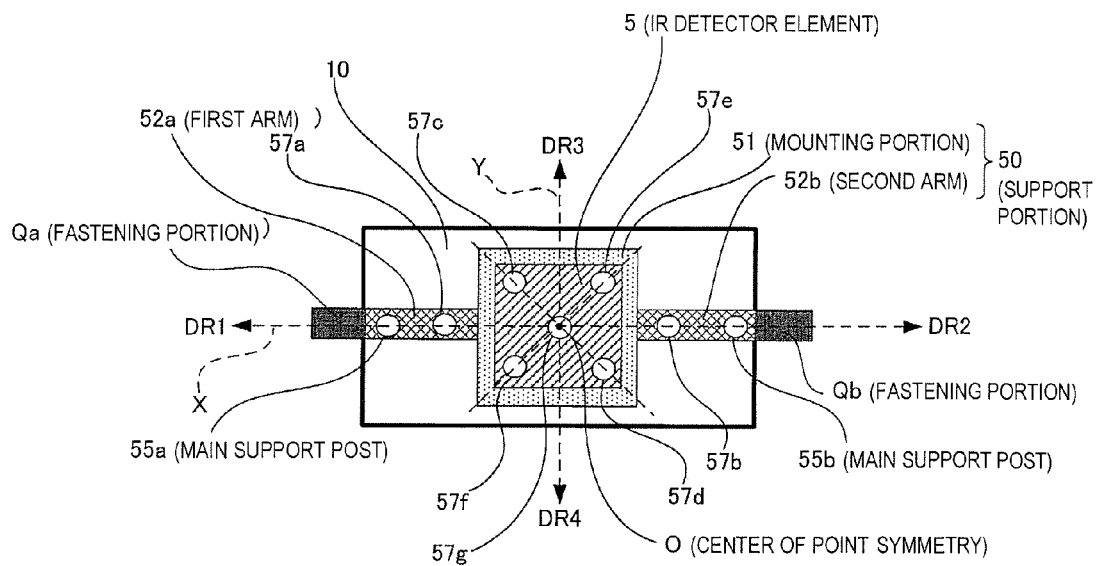
FIG. 6A and FIG. 6B are drawings illustrating an example of preferred placement of auxiliary support posts (and main support posts)
Figure 6B:
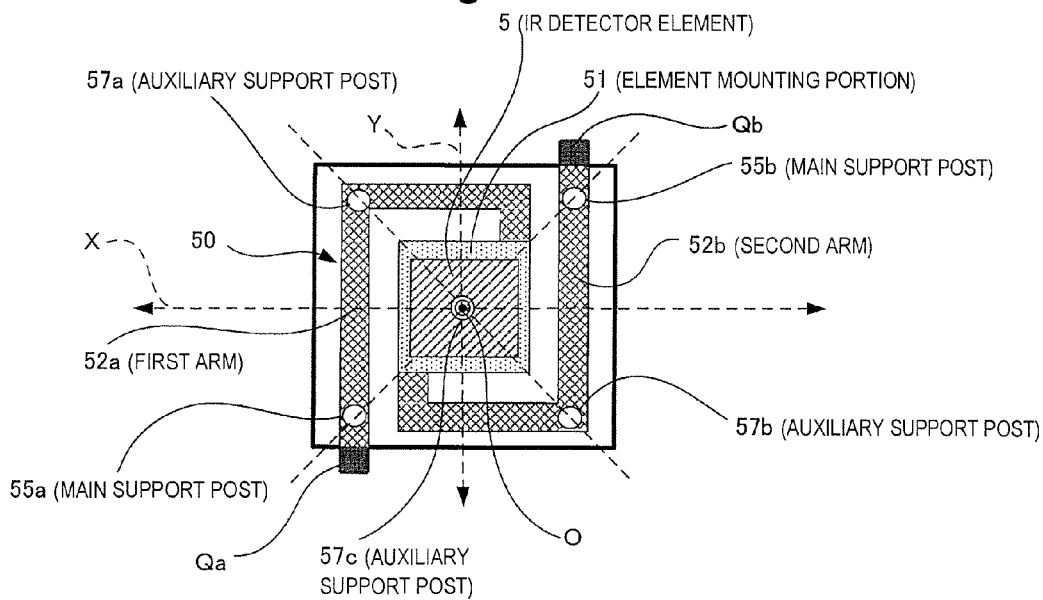

The present embodiment describes an example of preferred placement of auxiliary support posts (and main support posts). FIG. 6A and FIG. 6B are drawings illustrating an example of preferred placement of auxiliary support posts (and main support posts). In FIG. 6A and FIG. 6B, sections common to previous drawings are assigned like reference symbols.

If a structure whereby support posts are simply provided to support the support member 50 is adopted, during the manufacturing process, there is a possibility that the support posts will act as heat dissipation pathways, and therefore it is necessary for the support posts to be situated at locations away from the thermal detector element. Therefore, in the example of FIG. 6A, the main support posts 55a, 55b are situated large distances away from the thermal detector element 5. Specifically, the main support post 55a is disposed to the substrate side of the first arm 52a, and the main support post 55b is disposed to the substrate side of the second arm 52b.

On the other hand, as regards the auxiliary support posts of the present embodiment, once process steps that could experience problems have been completed, gaps are present between the auxiliary support posts and the support member, and there is no concern that heat dissipation pathways will form via the auxiliary support posts, and therefore no problems are encountered with formation of the auxiliary support posts at locations close to the thermal detector element. In view of this advantage, it is possible for the auxiliary support posts to be disposed at the locations shown in FIG. 6A, for example.

In FIG. 6A, auxiliary support posts 57a to 57e are provided in addition to the main support posts 55a, 55b. However, it is not essential to provide all of these auxiliary support posts, and the number and placement locations of the auxiliary support posts may be modified appropriately. In preferred practice, the placement locations of the support posts will be determined with consideration to mechanical balance.

One of the auxiliary support posts may be disposed at a location at the center of the support member 50 (i.e. disposing the auxiliary support post so as to have overlap with the center of the support member 50) in plan view. In FIG. 6A, the auxiliary support post 57g is disposed at the location of the center of the support member 50 (point O). The weight of the thermal detector element bears directly on the mounting portion 51 of the support member 50. Therefore, supporting the center point of the support member 50 with an auxiliary support post is effective in terms of inhibiting flexion, etc. of the support member.

Where the support member has a point-symmetric contour in relation to the center point (point O) (a contour such that the original shape is retraced after rotation by 180°) in plan view, the center point (point O) will coincide with the gravity center of the contour (i.e., the support member 50). The support member 50 shown in FIG. 6A has a point-symmetric contour in relation to the center point (point O) in plan view. Therefore, in the example of FIG. 6A, supporting the center point (point O) by utilizing the auxiliary support post 57g is effective in terms of inhibiting displacement (flexion or the like) and deformation (twisting or the like) of the support member 50 (the mounting portion 51 and the arms 52).

Moreover, pairs of auxiliary support posts may be respectively disposed at mutually point-symmetric locations with respect to the center of the support member 50 in plan view. In FIG. 6A, pairs of auxiliary support posts (57a and 57b, 57c and 57d, 57e and 57f) are respectively disposed at mutually point-symmetric locations (i.e., locations of mutual overlap with 180° rotation) with respect to the center point of the support member 50 (the center point of point symmetry) in plan view. By so doing, the support member 50 is supported in well balanced fashion by the respective pairs of auxiliary support posts, effectively inhibiting displacement and deformation.

In FIG. 6A, the pair of main support posts (55a and 56b) are likewise respectively disposed at mutually point-symmetric locations with respect to the center point of the support member 50 (the center point of point symmetry) in plan view.

Considerations pertaining to mechanical balance make it still more preferable for the support posts (the main support posts and the auxiliary support posts) to be disposed at line-symmetric locations. In FIG. 6A, the auxiliary support posts 57c and 57f and the auxiliary support posts 57e and 57d are disposed at line-symmetric locations with respect to an axis (designated the X axis) lying in a first direction DR1 (or a second direction DR2). The main support posts 55a and 55b are likewise disposed at line-symmetric locations with respect to a Y axis. The auxiliary support post 57g is disposed on the Y axis (along the X axis).

Also, in FIG. 6A, the auxiliary support posts 57a and 57b, the auxiliary support posts 57c and 57e, and the auxiliary support posts 57f and 57d are disposed at line-symmetric locations with respect to an axis (designated the Y axis) lying in a third direction DR3 (or a fourth direction DR4). The main support posts 55a and 55b, as well as the auxiliary support posts 57a, 57g, and 57b, are disposed on the X axis (along the X axis).

FIG. 6B shows another example of preferred placement of the auxiliary support posts (and the main support posts). In the example of FIG. 6B, the first arm 52a and the second arm 52b have shapes including inflected portions in plan view. Consequently, arm length may be longer, and higher thermal resistance may be created, whereby diffusion of heat towards the substrate from the infrared detector element may be effectively inhibited.

The support member 50 shown in FIG. 6B has a point-symmetric contour with respect to the center point (O point) in plan view. In FIG. 6B, the auxiliary support post 57c is disposed at the location of the center of the support member 50 (point O). The weight of the thermal detector element bears directly on the mounting portion 51 of the support member 50. Therefore, supporting the center point of the support member 50 with the auxiliary support post 57c is effective in terms of inhibiting flexion, etc. of the support member 50.

Also, in FIG. 6B, the pair of auxiliary support posts (57a and 57b) are respectively disposed at mutually point-symmetric locations (i.e., locations of mutual overlap with 180° rotation) with respect to the center point (the center point of point symmetry) 0 of the support member 50 in plan view. By so doing, the support member 50 is supported in well balanced fashion by the respective pair of auxiliary support posts, effectively inhibiting displacement and deformation. The pair of main support posts 55a and 55b are likewise disposed at mutually point-symmetric locations with respect to the center point (the center point of point symmetry) 0 of the support member 50 in plan view.

The main support post 55a and the auxiliary support post 57a, as well as the auxiliary support post 57b and the main support post 55b, are disposed at line-symmetric locations with respect to the X axis. Moreover, the auxiliary support post 57a and the main support post 55b, as well as the main support post 55a and the auxiliary support post 57b, are disposed at line-symmetric locations with respect to the Y axis. In the example of FIG. 6B, arm length can be extended, and because the support posts are disposed at point-symmetric (and line-symmetric) locations, mechanical balance is good. In the manufacturing process, the support member 50 is stably retained by the support posts.

Third Embodiment

FIG. 7 is a drawing showing another example of a thermal detector device (an example of a circuit element such as a transistor formed on a substrate). In FIG. 7, a plan view of a thermal detector (thermal type infrared detector) is shown at the top, and a cross-cross-sectional view is shown at the bottom. In FIG. 7, sections comparable to those in the preceding drawings are assigned like reference symbols.

In FIG. 7, on the surface of a p-type silicon substrate 11 there is formed a thin oxide film (gate oxide film) 15, and over the gate oxide film 15 there is formed a MOS transistor gate (e.g., a silicon gate) 9. The gate 9 and n-type diffusion layers 7a, 7b constitute a MOS transistor M1. This MOS transistor M1 may be utilized, for example, as a selective transistor M1 in the photodetector cell CL in FIG. 8.

An interlayer insulating film 13 ($SiO_2$ layer) is formed over the silicon substrate 11. The three-dimensional structure described above is formed over the interlayer insulating film 13. In the present embodiment, the section including the silicon substrate 11, and the interlayer insulating film 13 is considered as the substrate BS (base portion BS) broadly defined.

In the present embodiment, three auxiliary support posts (57a to 57c) are provided. Gaps Ga to Gc are formed between the support member 50 and each of the auxiliary support posts (57a to 57c). No main support posts are used in the present embodiment. In the example of FIG. 7, three contact portions (CX1 to CX3) are provided. Each of the contact portions (CX1 to CX3) is composed of a first metallization layer 31, a contact plug 32, a second metallization layer 33, a contact plug 34, a third metallization layer 35, a contact plug 36, and a fourth metallization layer 37.

Fourth Embodiment

Figure 8:
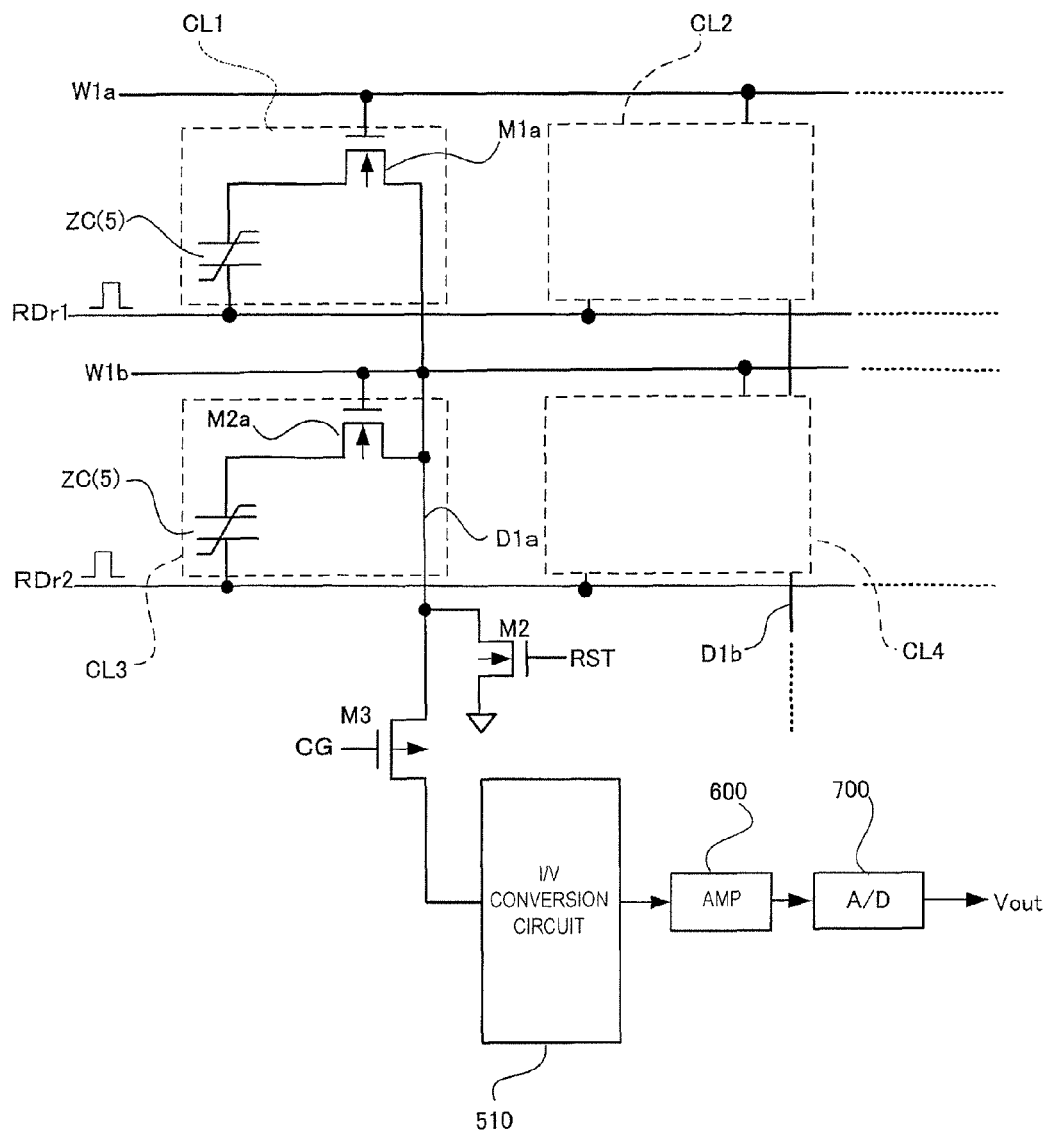
FIG. 8 is a circuit diagram showing an example of a circuit configuration of a thermal detector device (a thermal detector array)

FIG. 8 is a circuit diagram showing an example of a circuit configuration of a thermal detector device (a thermal type photodetection array). In the example of FIG. 8, a plurality of photodetector cells (CL1 to CL4, etc.) are arranged two-dimensionally. Scan lines (W1a, W1b, etc.) and data lines (D1a, D1b, etc.) are provided for selecting single photodetector cells from among the plurality of photodetector cells (CL1 to CL4, etc.).

The photodetector cell CL1 has a piezoelectric capacitor ZC provided as a thermal detector element 5, and an element selection transistor M1a. The potential relationship of the two poles of the piezoelectric capacitor ZC can be inverted by switching the potential applied to PDr1 (this potential inversion eliminates the need for a mechanical chopper). The photodetector cell CL2 has a comparable configuration (the other photodetector cells also have comparable configurations).

The potential of the data line D1a can be initialized by turning on a reset transistor M2. When reading out a sensor signal, a readout transistor M3 is turned on. Electrical current produced through the pyroelectric effect is converted to voltage by an I/V conversion circuit 510, amplified by an amp 600, and then converted to digital data by an A/D converter 700.

The present embodiment affords a thermal detector device (thermal type light array sensor) in which a plurality of thermal detectors (thermal detector elements) are arranged two-dimensionally (for example, arranged in arrays along two orthogonal axes (an X axis and a Y axis)).

Fifth Embodiment

Figure 9A:
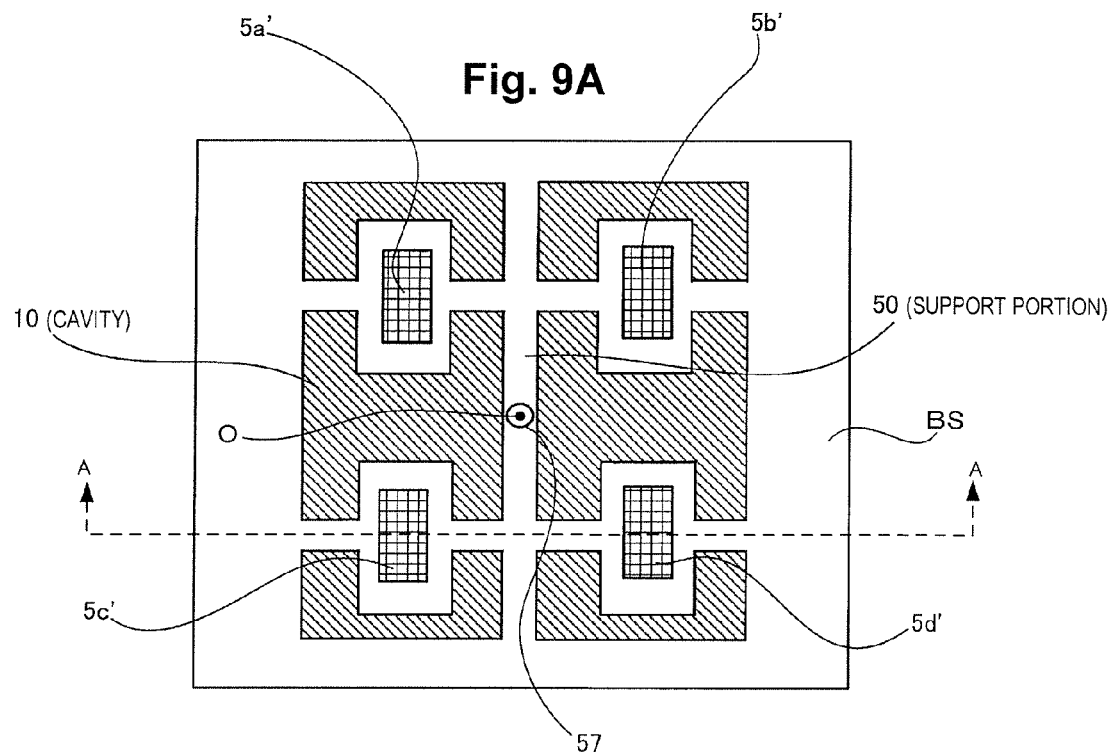
FIG. 9A and FIG. 9B are drawings showing an example of a bolometer having auxiliary support posts.
Figure 9B:
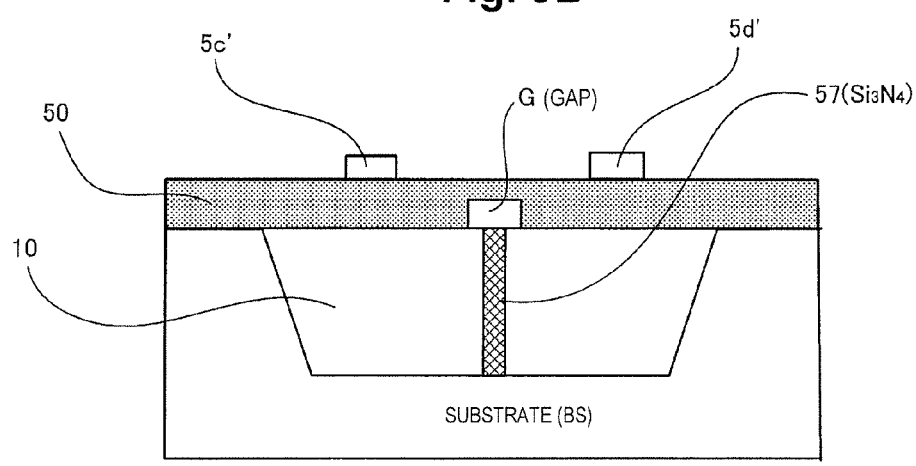

FIG. 9A and FIG. 9B are drawings illustrating an example of a bolometer having auxiliary support posts. FIG. 9A is a plan view, and FIG. 9B is a cross-cross-sectional view taken along line B-B. The bolometer of the present embodiment is a bolometer that uses a thermosensitive resistance element, for example.

As shown in FIG. 9A and FIG. 9B, a cavity 10 is formed in the substrate BS. The support member 50 is spaced apart from the substrate BS across this cavity 10. Four mounting portions 51a to 51d are provided to the support member 50. Four thermosensitive resistance elements (SiC thin film thermistors or the like) 5a' to 5d' are respectively mounted on the mounting portions 51a to 51d. The thermosensitive resistance elements 5a' to 5d' are connected to one another by a bridge circuit, for example.

Also, an auxiliary support post (made of $Si_3N_4$) is constituted at the location of the center point (the center point of point symmetry) 0 of the support member 50. A gap G is provided between the auxiliary support post 57 and the support member 50.

Sixth Embodiment

Figure 10:
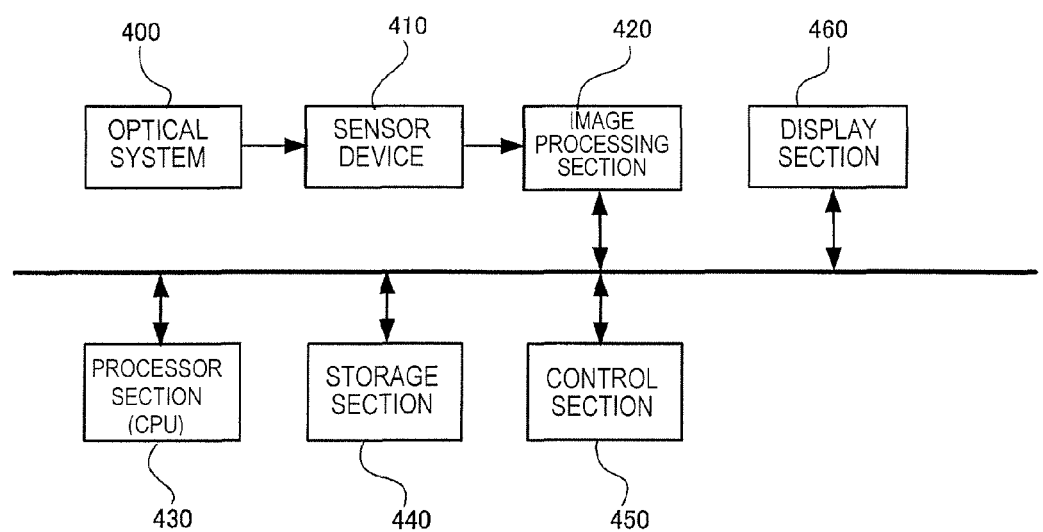
FIG. 10 is a block diagram depicting an example of a configuration of an electronic instrument including a thermal detector or thermal detector device.

FIG. 10 depicts a configuration example of an electronic instrument including the thermal detector or thermal detector device of the present embodiment. The electronic instrument is an infrared camera, for example. As illustrated, the electronic instrument includes an optical system 400, a sensor device (thermal detector device) 410, an image processing section 420, a processor section 430, a storage section 440, a control section 450, and a display section 460. The electronic instrument of the present embodiment is not limited to the configuration of FIG. 10, and various other modified embodiments in which some of the constituent elements thereof (e.g., the optical system, the control section, the display section, and so on) are omitted, or other constituent elements are added, are also possible.

The optical system 400 includes, for example, one or several lenses, a drive section for driving these lenses, and so on, and carries out formation of an object image on the sensor device 410, etc. The system may also carry out focus adjustment if needed.

The sensor device 410 is composed of photodetectors according to the preceding present embodiment in a two-dimensional arrangement, and is furnished with a plurality of row lines (scan lines (or word lines)) and a plurality of column lines (data lines). In addition to the two-dimensionally arrayed photodetectors, the sensor device 410 may include a row select circuit (row driver), a readout circuit for reading out data from the photodetectors via the column lines, an A/D converter, and the like. An imaging process of an object image can be carried out by sequentially reading out data from the two-dimensionally arrayed photodetectors.

On the basis of digital image data (pixel data) from the sensor device 140, the image processing section 420 carries out image processing of various kinds, such as image correction processes. The processor section 430 carries out control of the electronic instrument as a whole, or control of blocks within the electronic instrument. This processor section 430 is realized using a CPU, for example. The storage section 440 is used to store information of various kinds, and functions as a work area for the processor section 430 and the image processing section 420, for example. The control section 450 is an interface allowing a user to control the electronic instrument, and may be realized, for example, through various types of buttons, GUI (graphical user interface) screens, or the like.

The display section 460 is used to display, for example, images acquired by the sensor device 410, GUI screens, and the like, and may be realized through various types of display devices such as a liquid crystal display or an organic EL display.

In this way, besides using a single cell-equivalent thermal detector device as a sensor such as an infrared sensor, the sensor device 410 may be constituted by a two-dimensional arrangement of single cell-equivalent thermal detector devices along two orthogonal axial directions, whereby images of light (or temperature) distribution may be provided. Such a sensor device 410 may be utilized to build electronic instruments such as thermography systems, or vehicle-mounted night vision or monitoring cameras.

Of course, using either single cell-equivalent or multi-cell thermal detector devices as sensors, it is possible to build electronic instruments of various kinds, such as analytical systems (measurement systems) for analyzing (measuring) physical information of objects, security systems for detecting fire or heat, FA (factory automation) systems for factories, and the like.

While only selected embodiments have been chosen to illustrate the present invention, it will be readily apparent to those skilled in the art from the novel matters and effects of the present invention that numerous modifications may be made herein without substantially departing from the scope of the invention. Consequently, all modifications such as the above may be understood to fall within the scope of the invention. Terms disclosed together with different equivalent or broader terms in at least one instance in the specification or drawings, for example, may be replaced by these different terms at any place in the specification or drawings. For example, there are various possible modifications in relation to the constituent materials of the first sacrificial layer, the second sacrificial layer, and the third sacrificial layer, and to the method of removal thereof. The method of manufacturing the auxiliary support posts is not limited to the methods described above. As the method of manufacturing the auxiliary support posts, there may be employed a method that involves, for example, initially layering a cavity for thermal separation purposes, a second sacrificial layer for the auxiliary support posts, and a film for the support member (membrane), and forming the posts concomitantly during etch out of cavities in a trench pattern. There are also various possible modifications in relation to the constituent materials of the first sacrificial layer and the second sacrificial layer, the methods of removal thereof, and so on.

According to at least one embodiment of the present invention, it is possible, for example, to concomitantly reduce the thermal capacity of a support member for supporting a thermal detector element, while assuring mechanical strength necessary in the manufacturing process. The present invention has broad potential for application in various kinds of thermal detector devices (e.g. thermocouple type elements (thermopiles), pyroelectric elements, bolometers, and the like). The wavelength of the detected light is not critical.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A thermal detector comprising:
   a substrate;
   a thermal detector element including a light absorbing film;
   a support member supporting the thermal detector element, the support member supported on the substrate so that a cavity is defined by opposing surfaces of the support member and the substrate; and
   at least one auxiliary support post protruding from either the substrate or the support member towards the other, a gap being disposed adjacent to the at least one auxiliary support post in a region between the opposing surfaces of the support member and the substrate with a sum of a height of the at least one auxiliary support post and a height of the gap being substantially equal to or less than a maximum height between the opposing surfaces of the substrate and the support member, the gap being disposed in a position overlapping the at least one auxiliary support post as viewed along a direction normal to the substrate.

2. The thermal detector according to claim 1, wherein
   the support member has a mounting portion for mounting the thermal detector element, and at least one arm portion connected at a first end to the mounting portion and connected at another end to the substrate; and
   the at least one auxiliary support post is disposed at least between the mounting portion and the substrate, or between the at least one arm portion and the substrate.

3. The thermal detector according to claim 1, wherein one auxiliary support post is disposed at a location at the center of the support member, in plan view.

4. The thermal detector according to claim 1, wherein pairs of auxiliary support posts are respectively disposed at locations that are mutually point-symmetric with respect to the center of the support member in plan view.

5. The thermal detector according to claim 1, wherein the thermal detector element is an infrared detector element.

6. A thermal detector device comprising a plurality of the thermal detectors according to claim 1 that are two-dimensionally arranged.

7. An electronic instrument comprising the thermal detector according to claim 1.

8. An electronic instrument comprising the thermal detector device according to claim 6.

9. A thermal detector device comprising a plurality of the thermal detectors according to claim 2 that are two-dimensionally arranged.

10. An electronic instrument comprising the thermal detector according to claim 2.

11. An electronic instrument comprising the thermal detector device according to claim 9.

12. A thermal detector device comprising a plurality of the thermal detectors according to claim 3 that are two-dimensionally arranged.

13. An electronic instrument comprising the thermal detector according to claim 3.

14. An electronic instrument comprising the thermal detector device according to claim 12.

15. A thermal detector device comprising a plurality of the thermal detectors according to claim 4 that are two-dimensionally arranged.

16. An electronic instrument comprising the thermal detector according to claim 4.

17. An electronic instrument comprising the thermal detector device according to claim 15.

* * * * *